US012050281B2

(12) United States Patent
Meiyappan

(10) Patent No.: US 12,050,281 B2
(45) Date of Patent: Jul. 30, 2024

(54) SYSTEMS AND METHODS OF RADIO FREQUENCY DATA MAPPING AND COLLECTION FOR ENVIRONMENTS

(71) Applicant: ECSite, Inc., Santa Clara, CA (US)

(72) Inventor: Subramanian S. Meiyappan, San Jose, CA (US)

(73) Assignee: ECSite, Inc., Santa Clara, CA (US)

(*) Notice: Subject to any disclaimer, the term of this patent is extended or adjusted under 35 U.S.C. 154(b) by 23 days.

(21) Appl. No.: 17/719,988

(22) Filed: Apr. 13, 2022

(65) Prior Publication Data

US 2022/0326340 A1 Oct. 13, 2022

Related U.S. Application Data

(60) Provisional application No. 63/174,365, filed on Apr. 13, 2021.

(51) Int. Cl.
*G01S 5/02* (2010.01)

(52) U.S. Cl.
CPC ...... *G01S 5/02525* (2020.05); *G01S 5/02522* (2020.05); *G01S 5/0264* (2020.05); *G01S 5/02524* (2020.05); *G01S 5/02585* (2020.05)

(58) Field of Classification Search
CPC .............. G01S 5/02525; G01S 5/0264; G01S 5/02522; G01S 5/02524; G01S 5/02585
USPC ........................................................ 342/451
See application file for complete search history.

(56) References Cited

U.S. PATENT DOCUMENTS

| | | | |
|---|---|---|---|
| 8,538,442 B1* | 9/2013 | Ettinger | H04W 40/244 |
| | | | 455/446 |
| 9,002,373 B2* | 4/2015 | Marti | G01S 5/0249 |
| | | | 370/332 |
| 9,258,797 B2* | 2/2016 | Skomra | H04B 3/542 |
| 10,070,253 B2* | 9/2018 | Kang | H04W 4/33 |
| 10,798,538 B2* | 10/2020 | Jain | G06V 20/52 |
| 11,054,497 B2* | 7/2021 | Wirola | G01S 5/0236 |
| 11,150,322 B2* | 10/2021 | Jadav | H04W 4/33 |
| 11,156,694 B2* | 10/2021 | Ivanov | H04W 64/00 |
| 11,226,391 B2* | 1/2022 | Luomi | G01S 5/02521 |
| 11,438,861 B2* | 9/2022 | Nurminen | H04M 1/0202 |
| 11,448,719 B2* | 9/2022 | Khan | G01C 21/206 |
| 11,570,581 B2* | 1/2023 | Ivanov | G01S 5/02524 |
| 2017/0223502 A1* | 8/2017 | Jagannath | H04W 4/023 |
| 2020/0393248 A1* | 12/2020 | Khan | G01C 21/383 |
| 2021/0055372 A1* | 2/2021 | Rauhala | H04W 4/029 |

* cited by examiner

*Primary Examiner* — Chuong P Nguyen
(74) *Attorney, Agent, or Firm* — Dority & Manning, P.A.

(57) ABSTRACT

Systems and methods of radio frequency data mapping are provided. An exemplary method includes moving a mobile mapping system through the environment, the mobile mapping system comprising a location detection element and a radio frequency (RF) instrument which receives data from an antenna of the mobile mapping system; collecting data from the RF instrument at one or more collection locations within the environment, the collected data including received signal strength indicator (RSSI) data; mapping the collected data at least in part based on data received from the location detection element and the RF instrument to form an RF fingerprint of the environment; and using the mapped data to confirm an anticipated environmental RF fingerprint associated with the environment, adjust one or more RF components associated with the environment, or both.

20 Claims, 3 Drawing Sheets

SYSTEMS AND METHODS OF RADIO FREQUENCY DATA MAPPING AND COLLECTION FOR ENVIRONMENTS

CROSS-REFERENCE TO RELATED APPLICATIONS

The present application claims priority to U.S. Provisional Patent Application 63/174,365 filed on Apr. 13, 2021, the disclosure of which is incorporated by reference herein in its entirety

FIELD

The present invention relates to radio frequency (RF) data mapping and collection of RF data for environments such as buildings and structures, urban canyons, tunnels, stadiums, casinos, concert halls, shopping malls, industrial facilities, and the like.

BACKGROUND

Environmental spaces with antenna systems are subject to RF interference and attenuation. For example, in-building distributed antenna systems may suffer as a result of structures within the building. Without understanding the RF interference and attenuation caused by these structures, there are likely to be areas in the building where RF coverage (e.g., cell phone reception) is poor. Moreover, there may be areas where additional antennas are required, thus increasing cost.

At present, mapping RF environments is performed by a human operator manually recording signal strength by moving through the environment. For example, the operator may walk into the building with a cell phone, recording the signal strength as measured by a cellular device. As the operator moves, the signal strength may change. The operator can record these changes.

Industries affected by RF interference and attenuation continue to demand more efficient, accurate, and repeatable means to thoroughly characterize RF environments. Accurate radio planning prior to a building's completion reduces cost and ensures optimal RF reception, performance, and dependability for all users. Further, since some users of the building's RF facilities are safety personnel (such as medical first responders, fire fighters, or police) a predictable, stable, always-functional RF environment is essential.

BRIEF DESCRIPTION

Aspects and advantages of the invention in accordance with the present disclosure will be set forth in part in the following description, or may be obvious from the description, or may be learned through practice of the technology.

In accordance with one embodiment, a method of mapping an environment is provided. The method includes moving a mobile mapping system through the environment, the mobile mapping system comprising a location detection element and a radio frequency (RF) instrument which receives data from an antenna of the mobile mapping system; collecting data from the RF instrument at one or more collection locations within the environment, the collected data including received signal strength indicator (RSSI) data; mapping the collected data at least in part based on data received from the location detection element and the RF instrument to form an RF fingerprint of the environment; and using the mapped data to confirm an anticipated environmental RF fingerprint associated with the environment, adjust one or more RF components associated with the environment, or both.

In accordance with another embodiment, a system for mapping an environment is provided. The system includes an antenna; a radio frequency (RF) instrument that collects data from one or more locations within the environment using the antenna, the data including received signal strength indicator (RSSI) data; a location detection element; and an optical scanner that maps one or more physical components in the environment, wherein the RF data and data from either one or both of the location detection element or optical scanner are used by a processor to generate mapped data associated with the environment.

In accordance with another embodiment, a system for mapping an environment is provided. The system includes a moveable unit including either a moveable cart having a plurality of wheels and a handle or a backpack; an antenna coupled to the moveable unit; a radio frequency (RF) instrument coupled to the moveable unit, wherein the RF instrument collects data from one or more locations within the environment using the antenna, the data including received signal strength indicator (RSSI) data; a location detection element that determines a three-dimensional spatial position of at least one component of the moveable unit while a mapping operation is in progress and geotags the RF data; a light detection and ranging (LIDAR) device that takes three-dimensional samples of the environment; and a processor that generates an RF fingerprint of the environment using the RF data, the location data, and the LIDAR data.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
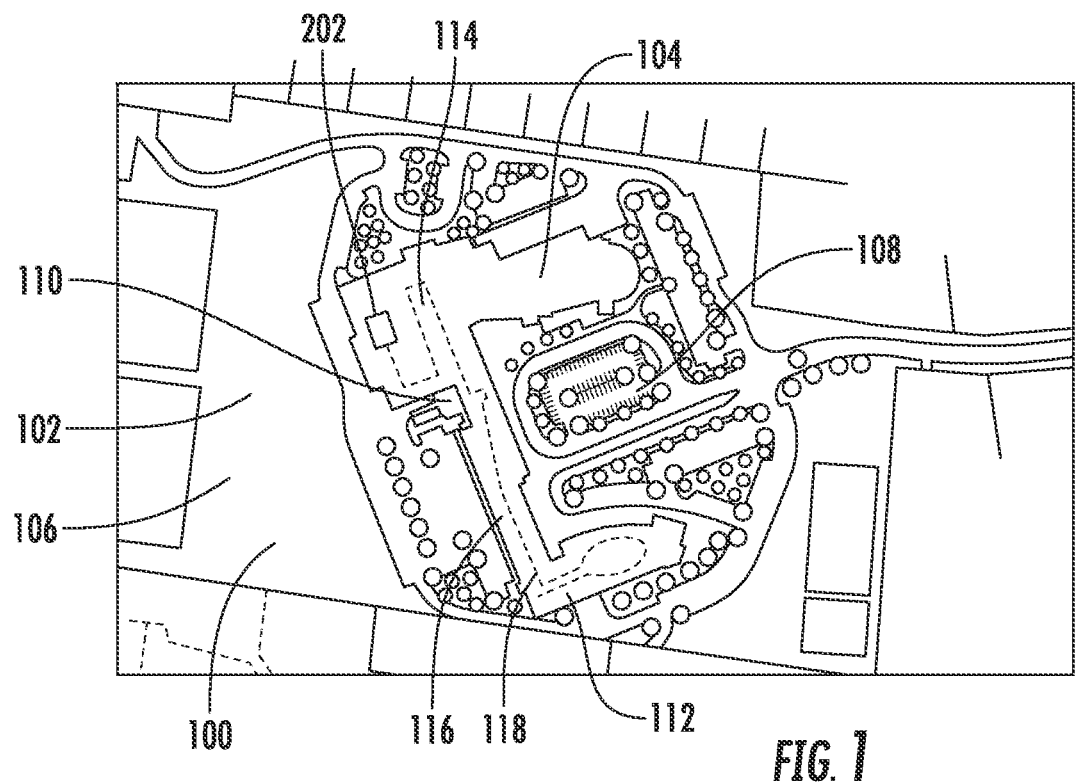
FIG. 1 is a schematic view of an environment in which mobile mapping is performed in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any Other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly gated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, embodiments in accordance with the present disclosure allow an operator to RF map one or more various different environments. The environments can include, for example, buildings and structures, urban canyons, tunnels, stadiums, casinos, concert halls, shopping malls, industrial facilities, and the like. Using the RF map, it may be possible to design structures which have better RF propagation and utility. The invention is applicable to environments that are in the process of being planned, in mid-construction, or completed.

Referring now to the drawings, FIG. 1 illustrates a schematic view of a non-limiting, exemplary environment 100 including both exterior space 102 and interior space 104. The exterior space 102 includes wide-open locations 106, semi-open locations 108, and tight locations 110. In an embodiment, the wide-open locations 106 may include areas of the environment 100 unencumbered by trees, bushes, mountains, or man-made objects which might distort data readings as described herein. This distortion can include, for example, loss of signal and deterioration of signal. Semi-open locations 108 can include areas with minimal to moderate encumbrances such as trees, bushes, hills, boulders, vehicles, fences, or the like. In the depicted embodiment, the semi-open location 108 includes trees, vehicles, railing, sidewalks, signage, and the like. Tight locations 110 may correspond with exterior areas that are less than a prescribed size, e.g., less than 1000 square feet, or which include a sufficient level of encumbrances so as to distort data readings. The interior space 104 is defined by a building 112 including one or more relatively large areas 114 and one or more relatively small areas 116. It should be understood that these designations are exemplary only. Yet other designations and definitions are possible without deviating from the scope of the invention.

In certain instances, it may be desirable to map one or more locations in the exterior space 102, the interior spaces 104, or both for the purpose of determining a radio frequency (RF) fingerprint of the environment 100. An RF fingerprint of the environment 100 can generally include RF signatures of individual locations within the environment 100, such as RF signatures within the building 112. Each RF signature can include, for example, information associated with RF signal strength at that particular location, RF transmissivity of nearby objects, and the like. By forming an RF fingerprint, the environment 100 may be easily designed and mapped to provide optimal RF performance. For instance, by way of non-limiting example, in certain areas of the building 112, e.g., within the small area 116 of the building 112, there may be certain environmental characteristics such as thick walls, metal structures, HVAC structure, magnetic elements, or the like which can affect RF performance in that area. As such, devices relying on RF may suffer from poor performance in these areas. By obtaining an RF fingerprint, equipment like transmitters and relays, can be effectively implemented to maximize RF performance. For example, if the small area 116 of the building 112 has an RF performance below a threshold level, it may be desirable to position an RF relay at a location to boost the RF performance to a desirable level. Additionally, systems and methods described herein can be used to confirm an anticipated RF fingerprint. For example, if the building is intended to operate at or above an RF threshold, use of systems and methods described herein can allow the contractors to confirm that such RF thresholds are met.

Figure 2:
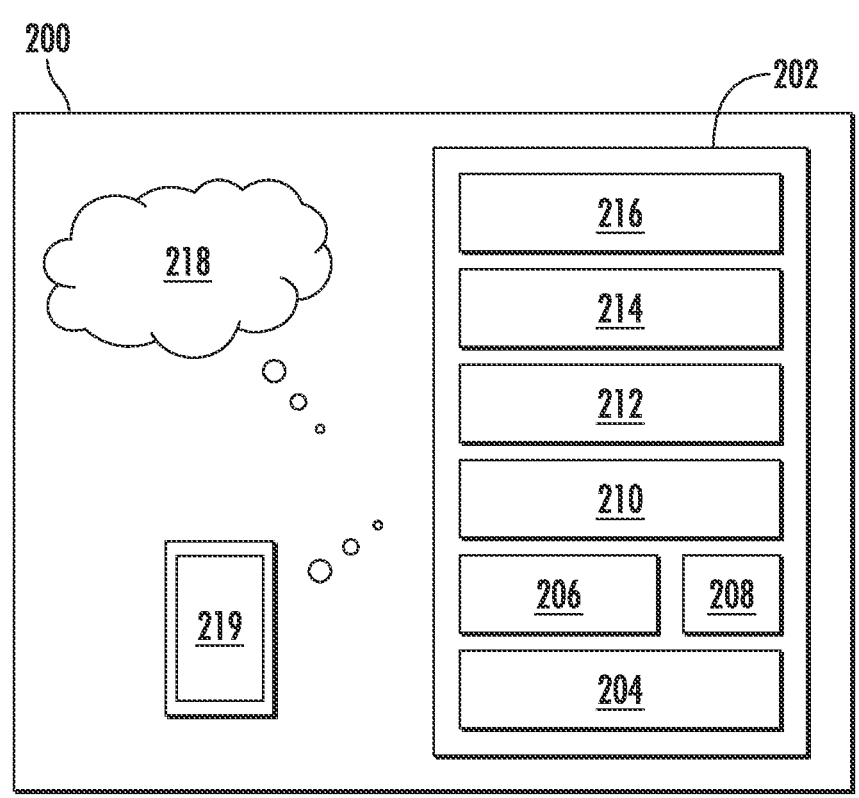
FIG. 2 is a schematic view of a mobile mapping system in accordance with embodiments of the present disclosure.

Turning to FIG. 2, a schematic of a system 200 for mapping an environment, e.g., the environment 100, is provided in accordance with an exemplary embodiment. The system 200 can generally be used by an operator to map RF fingerprints in environments 100, such as the exemplary environment 100 depicted in FIG. 1. The system 200 can include a movable unit 202 which allows the operator to move the system 200 throughout the environment. The movable unit 202 can include a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. By way of non-limiting example, the movable unit 202 can include a cart or other structure with a walking element having one or more wheels, treads, skis, rollers, or the like which allows the operator to readily move the movable unit 202 through the environment. In some instances, the movable unit 202 can include a strap, e.g., a shoulder strap, which allows the operator to carry the movable unit 202.

In an embodiment, the movable unit 202 can receive and hold a power source 204. By way of non-limiting example, the power source 204 can include one or more batteries, an engine, a photovoltaic device, or the like. In certain instances, the power source 204 can include an interface such as a power inlet connection that connects with an external power source, such as an electrical wall outlet. In this regard, the power source 204 can be charged between uses. The power source 204 can provide electrical power to one or more of the systems or components described herein.

The movable unit 202 can further include an antenna 206. In one or more embodiments, the antenna 206 can include a single antenna. In other embodiments, the antenna 206 can include an array antenna including a plurality of elements. The antenna 206 can interface with radio waves propagating through the environment 100 and convert the received radio waves into electrical currents. The received currents, or data associated therewith, can then be stored or interpreted by another element of the system 200.

The antenna 206 can be in electrical communication with at least one of a transmitter or a receiver of the system 200, collectively illustrated as transmitter/receiver 208. In some instances, the transmitter can supply electrical current to the antenna 206 which can radiate the energy from the current as electromagnetic waves, also known as radio waves. The receiver can be coupled to the antenna 206 to receive and amplify the received radio waves into a usable electrical current for analysis.

In an embodiment, the movable unit 202 can further include a location detection element 210. The location detection element 210 can determine a spatial position of the movable unit 202 (or one or more components thereof) with respect to the environment. In certain instances, this spatial position can be determined as a three-dimensional spatial position operating in, e.g., an X-, Y-, Z-cartesian coordinate system. In other instances, this spatial position can be determined in a two-dimensional spatial position. For example, the spatial position can include X- and Y-coordinates or even latitude and longitude. The location data from the spatial position can be used as part of methods described herein to map the RF fingerprint of the environment 100.

In an embodiment, the location detection element 210 comprises a global positioning satellite (GPS) system. In a more particular embodiment, the location detection element 210 can operate using differential global positioning system, e.g., DGNSS. In another embodiment, the location detection element 210 can include a beacon detection system which determines spatial location of the movable unit 202 by referencing one or more stationary objects, e.g., beacons, disposed at the environment. By way of a non-limiting example, the beacon detection system can determine relative distances to a plurality of beacons disposed at the environment 100. These distances can then be used to determine the spatial location of the movable unit 202, for example using position triangulation techniques. It should be understood that other location detection elements utilizing the same or different types of location detection techniques can be implemented without deviating from the scope of the disclosure.

In an embodiment, the moveable unit 202 can further include an RF instrument 212. In some instances, the RF instrument 212 can include a spectrum analyzer. By way of example, the spectrum analyzer can be swept-tuned or FFT-based. In other instances, the RF instrument 212 can be an electromagnetic EMI receiver. In embodiments described herein, the RF instrument 212 can be in communication with the antenna 206, e.g., through the transmitter/receiver 208.

The RF instrument 212 can be configured to determine one or more characteristics, e.g., measurements, of RF behavior in view of the radio waves propagating in the environment and received by the antenna 206. By way of non-limiting example, the characteristics of RF behavior can include measurements of frequency response, noise, distortion characteristics, or the like. In some instances, the RF instrument 212 can operate using GSM frequency bands or UMTS frequency bands.

In an embodiment, the movable unit 202 can further include an optical scanner 214. Exemplary optical scanners 214 include cameras, light detection and ranging (LIDAR) devices, or the like. The optical scanner 214 can capture data associated with objects at the environment and the environment itself. In some instances, the optical scanner 214 can be static with respect to the movable unit 202. In such instances, the optical scanner 214 can capture a field of view dependent on the angular orientation of the movable unit 202. In other instances, the optical scanner 214 can view a 360-degree view of the movable unit 202. In yet other instances, the optical scanner 214 can be movable with respect to the movable unit 202. For example, the optical scanner 214 can be rotated about one or more axis to change the field of view independent of the orientation of the movable unit 202. In this regard, the optical scanner 214 can be movable to allow for capture of different angles independent of the orientation of the movable unit 202.

In an embodiment, the optical scanner 214 can capture three dimensional views of the surrounding environment 100 and map physical components therein. In certain instances, e.g., when using LIDAR, it may be possible to detect material composition of one or more elements in the environment 100. For example, the optical scanner 214 may be able to capture information which allows for detection of metals and other materials which impede RF transmission. The optical scanner 214 may be able to determine a surface's ability to pass RF efficiently or poorly. For instance, thick metal surfaces may completely prohibit passage of RF. The optical scanner 214 can detect such features for purpose of mapping the environment 100. Information such as this may be used to adjust, e.g., the number and strength of in-building RF antennas to correctly compensate for RF behavior. Traditional methods of collecting this information are incapable of determining such RF behavior with any degree of accuracy.

At least one, such as both, of the RF instrument 212 and optical scanner 214 can be in electronic communication with a data collection device 216. The data collection device 216 can include, for example, a memory unit, such as for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. The data collection device 216 may include or be in communication with processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The data collection device 216 can also, or alternately, include software control means implemented with a processor or logic circuitry, for example. The data collection device 216 can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

In one or more embodiments, the data collection device 216 can be in wireless communication with a remove device, such as cloud storage 218 or a mobile device 219 (such as a smart phone, laptop, desktop, or the like), through, e.g., an internet connection. In this regard, some or all of the information stored at the data collection device 216 can be sent to a remote, e.g., offsite, location for processing or analysis. In this regard, at least a portion of the mapping can be performed at a location external to the environment 100. In one or more embodiments, the operator may be able to view the mapped data, e.g., the RF fingerprint of the environment 100, through an augmented reality (AR) device, a virtual reality (VR) device, or the like.

Referring again to FIG. 1, the movable unit 202 may be moved through the environment 100 along a path 118. The path 118 shown in FIG. 1 is exemplary only and not representative of every possible path that may be taken through the environment. The path 118 can include linear portions, arcuate portions, or both. In some instances, the path 118 can be formed from several straight segments connected together at angled turns. The angled turns can be 90 degree turns or turns having different angles. In some instances, the path 118 can zig-zag through the environment 100. In other instances, the path 118 can systemically move through the environment, e.g., using a series of gridded movements.

In some instances, the movable unit 202 can be propelled along the path 118 by human power, i.e., a human operator can push the movable unit 202. In other instances, the movable unit 202 can be moved along the path 118 at least partially propelled by a motor, an engine, or the like. In yet other instances, the movable unit 202 can be an autonomous, or semi-autonomous, movable unit 202 which is automatically guided and propelled through the environment 100.

As the movable unit 202 moves through the environment 100, the RF instrument 212 can take measurements of the environment's RF behavior. In some instances, the RF instrument 212 can take measurements when the movable unit 202 is stopped. That is, for instance, the operator can move the movable unit 202 some distance along the path 118 and stop so that the RF instrument 212 can take a measurement. The operator can then move the movable unit 202 some further distance along the path 118 and again stop so that the RF instrument 212 can take a measurement. This process can be repeated as necessary or desired. In certain instances, the time required at each stop can be fixed such that each stop takes a set duration of time. In other instances, the time required at each stop can be variable, e.g., in view of the particular portion of the environment being mapped. For example, larger environments or environments with complex RF signatures may require additional stoppage time.

In an embodiment, these collection locations, i.e., where the RF instrument takes measurements in the environment 100, can be discrete locations. For example, in some instances, the operator can receive an instruction, e.g., from a user interface (not illustrated) of the movable unit 202 or another device, to stop so that the RF instrument 212 can take a measurement at that location. In this regard, the movable unit 202 can at least partially inform the locations at which the RF instrument 212 takes measurements in the environment 100. Exemplary user interfaces include visual indicators, audible indicators, tactile indicators, and the like. In other instances, the operator can stop the movable unit 202 at fixed distance intervals or at specific time intervals.

In an embodiment, the RF instrument 212 can be configured to take measurements of the environments RF behavior while the movable unit 202 is moving through the environment 100. That is, the RF instrument 212 can take measurements while the movable unit 202 is in motion, thus not requiring the operator to stop moving the movable unit 202 for measurement procurement.

The RF measurements can be stored, e.g., on the data collection device 216, on the cloud 218, or both. In some instances, the RF measurements can be at least temporarily stored on the data collection device 216 while the movable unit 202 is being moved through the environment. Once the measurement process is completed, the RF measurements can be transmitted to the cloud 218. In other instances, the RF measurements can be at least partially sent to the cloud 218 in real time, e.g., while the measurement process is being performed.

The RF measurements taken by the RF instrument 212 may include received signal strength indicator (RSSI) data. The RSSI data is a measurement of the power (strength) in the received radio signal at the antenna. This RSSI information can indicate information about the environment in which the system 200 is located within. Thus, for each location at which the RF instrument 212 takes a measurement, the system 200 can determine signal strength. In some instances, the system 200 can measure quality of coverage from outside cell-towers with cellular-specific metrics, such as Reference Signal Received Quality (RSRQ) or packet loss, Bit Error Rate (BER), or the like.

RSSI measurements can include both RF signal information (i.e., that part of the RF that carries data, voice, and other user-valued information) as well as noise. Noise, in this context, can refer to RF energy that is unwanted. Noise may be due to reflections, external RF sources, and/or other undesirable artifacts associated with the local RF environment. These reflections and artifacts may occur, for example, as a result of material selection in buildings and objects contained in the environment which affect RF signals. In some instances, metrics such as RSRQ and BER can measure the quality of the RF signal and can be used to ensure that the RF signal strength quantities reported by the movable unit 202 represents the desirable RF, and not the noise.

The system 200 can be further configured to utilize the optical scanner 214 while mapping the RF fingerprint. The optical scanner 214 can collect one or more images of the environment 100 that allow for a three dimensional (3D) geometric model to be compiled.

In some instances, the optical scanner 214 can collect images at each point in time when the RF instrument 212 measures RF. In this regard, each location at which RF measurements are taken can include one or more images of the environment. In other instances, the optical scanner 214 can collect images at different times relative to collection of RF measurements. In an embodiment, the optical scanner 214 can collect images at all times while the movable unit 202 is moving through the environment 100. In another embodiment, the optical scanner 214 can collect images at preset intervals, such as at preset distances or preset time durations.

Compiling the RF measurements with the image(s) taken from the optical scanner 214 can allow the system 200 to form a comprehensive 3D fingerprint of the environment 100 which can allow for enhanced RF design therein. For example, data from the mapping and RF field strength measurements can be used to provide a combination of physical and RF data that permits precise knowledge of the environment's RF fingerprint. This data may be used to either confirm that the environment, e.g., the building 112, will be as good as planned, or may also be used to adjust the environment or the RF equipment (e.g., amplifiers, antennas, or the like) to improve local areas of poor RF performance. This allows improved radio planning for environments, e.g., buildings, and venues that are not yet fully constructed. It also provides tools to properly radio-plan networks in buildings that are changing due to construction. In this regard, the systems and methods described herein may be used multiple times during the construction process to monitor and update the RF equipment to ensure proper RF tolerance and design.

RF mapping performed in accordance with embodiments described herein can include mapping of RF at a finite number of locations. For instance, measuring RF in the building 112 depicted in FIG. 1 may occur at points only disposed along the path 118. Moreover, in certain instances, the RF instrument 212 may not take an RF measurement at every location along the path. To generate a more complete RF fingerprint, it may be possible to utilize either or both interpolation and/or extrapolation. Interpolation can refer to a method of determining RF characteristics between measurement locations taken by the system 200. That is, interpolation can fill in the blanks between detection locations. Extrapolation can refer to a method of determining RF characteristics outside of a grid of measurements taken by the system 200.

Figure 3:
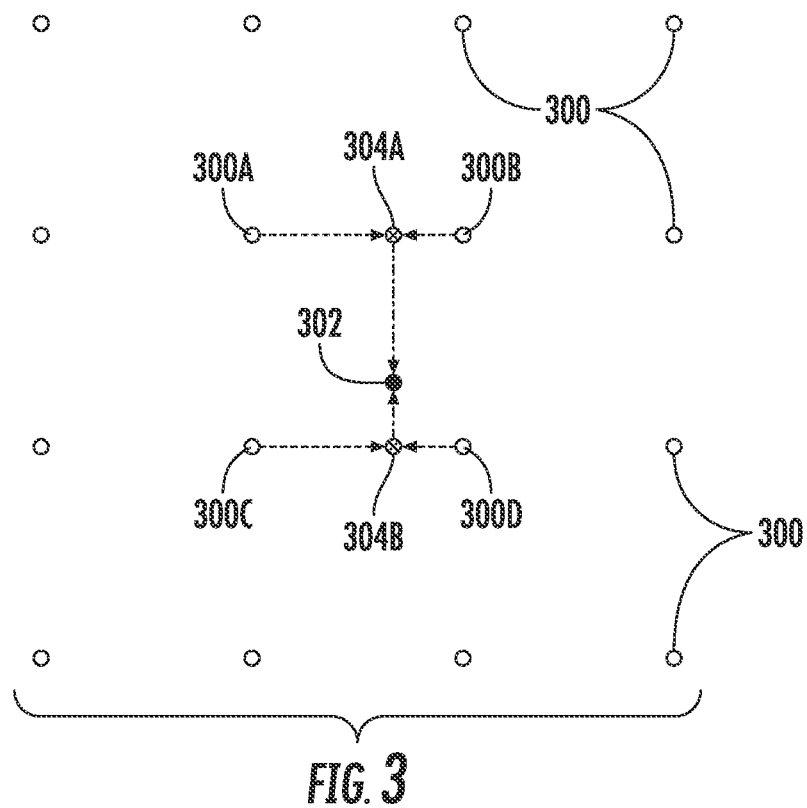
FIG. 3 is a schematic of a portion of an environment in accordance with embodiments of the present disclosure.

FIG. 3 depicts a schematic view of a portion of an environment. Depicted in the environment are a plurality of locations 300 (including a first location 300A, a second location 300B, a third location 300C and a fourth location 300D) corresponding to locations where the RF instrument 212 (FIG. 2) took RF measurements. As depicted, it may be desirable to determine RF at a non-measured location 302. The non-measured location 302 is disposed between locations 300. More particularly, the non-measured location 302 is disposed between the first, second, third and fourth locations 300A, 300B, 300C and 300D. Thus, using interpolation, the system 200 (or an external device) may be able to determine the RF characteristic at the non-measured location 302.

By way of non-limiting example, interpolation can include bilinear interpolation as shown in FIG. 3 and as described below. Using this technique, RF field strength of a first linear interpolation data point 304A and a second linear interpolation data point 304B can be determined using data from the first and second locations 300A and 300B and the third and fourth locations 300C and 300D, respectively. This technique may involve averaging the measured locations (e.g., measured locations 300A and 300B), weighted averaging the measured locations, or the like. Using the first and second linear interpolation data points 304A and 304B, the non-measured location 302 can be determined using further linear interpolation between the first and second linear interpolation data points 304A and 304B. This technique may involve averaging the first and second linear interpolation data points 304A and 304B, weighted averaging, or the like. This process can be repeated to achieve a desired mapping density having characteristic data points at a desired resolution. For example, data resolutions of at least 1 data point per 100 square feet may be achieved, such as at least 5 data points per 100 square feet, such as at least 10 data points per 100 square feet, such as at least 25 data points per 100 square feet, such as at least 50 data points per 100 square feet, such as at least 75 data points per 100 square feet, such as at least 100 data points per 100 square feet, such as at least 150 data points per 100 square feet, such as at least 200 data points per 100 square feet, such as at least 500 data points per 100 square feet. Moreover, as depicted in FIG. 3 the data points can be variably staggered between the measured locations 300. For example, the non-measured location 302 is closest to the fourth location 300D and furthest from the first measured location 300A. Secondary interpolation may be performed using data from, e.g., the non-measured location 302, to further interpolate additional RF data at other locations within the environment.

Figure 4:
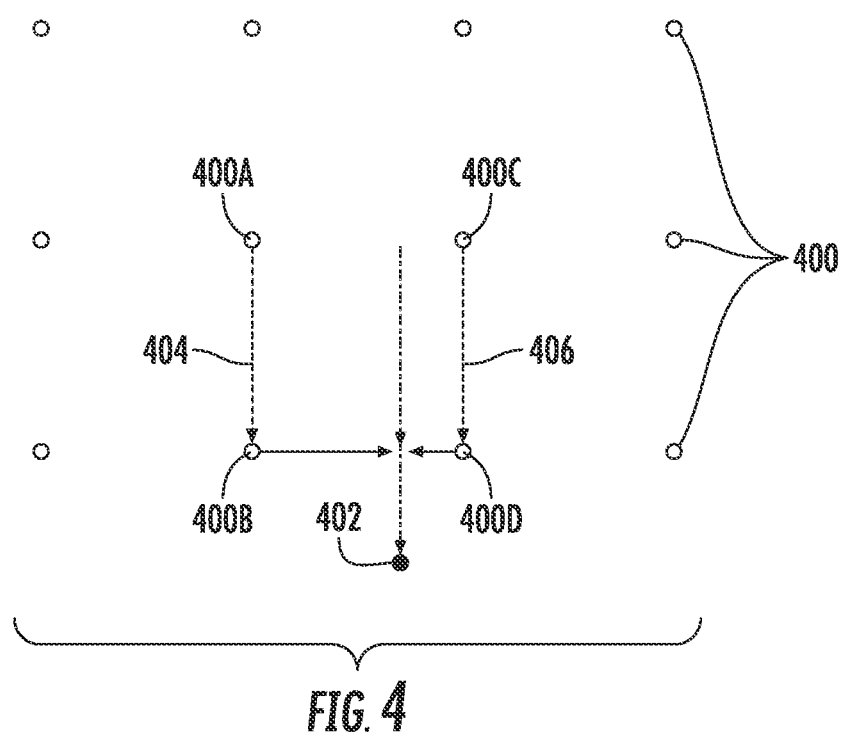
FIG. 4 is a schematic of a portion of an environment in accordance with embodiments of the present disclosure.

FIG. 4 depicts a schematic view of a portion of another environment. Similar to FIG. 3, depicted in the environment in FIG. 4 are a plurality of locations 400 (including a first location 400A, a second location 400B, a third location 400C and a fourth location 400D) corresponding to locations where the RF instrument 212 (FIG. 2) took RF measurements. As depicted, it may be desirable to determine RF at a non-measured location 402. The non-measured location 402 is disposed outside of locations 400. More particularly, the non-measured location 402 is disposed outside of the first, second, third and fourth locations 400A, 400B, 400C and 400D. As such, the aforementioned interpolation methodology may not be effective at determining the RF characteristic at the non-measured location 402. However, using extrapolation, the system 200 (or an external device) may be able to determine the RF characteristic at the non-measured location 402.

By way of non-limiting example, extrapolation can be performed by taking a set of RF measurements and estimating the gradient of the RF field within each set of RF measurements. For example, a first gradient 404 may be estimated between a first set of RF measurements including RF measurements from the first and second locations 400A and 400B. Similarly, a second gradient 406 may be estimated between a second set of RF measurements including RF measurements from the third and fourth locations 400C and 400D. The estimated gradient can determine a change in RF signal strength over the distance of the gradient, i.e., between the measured locations associated with that gradient. Using these gradients 404 and 406 and the scalar field value at each measured location associated with the measured locations, and optionally the information associated with the LIDAR-based knowledge of structure materials and analysis of RF behavior, it may be possible to estimate the RF field behavior at the non-measured location 402. In other embodiments, additional gradients in other directions, e.g., perpendicular to the gradients 404 and 406 or otherwise angularly offset from the gradients 404 and 406, can further be estimated and used to extrapolate RF behavior at the non-measured location 402.

Using at least one, such as both, interpolation and extrapolation, the RF characteristic can be accurately estimated, which can allow for proper placement and installation of, e.g., RF amplifiers and other equipment necessary to provide a desired RF footprint at the environment.

Figure 5:
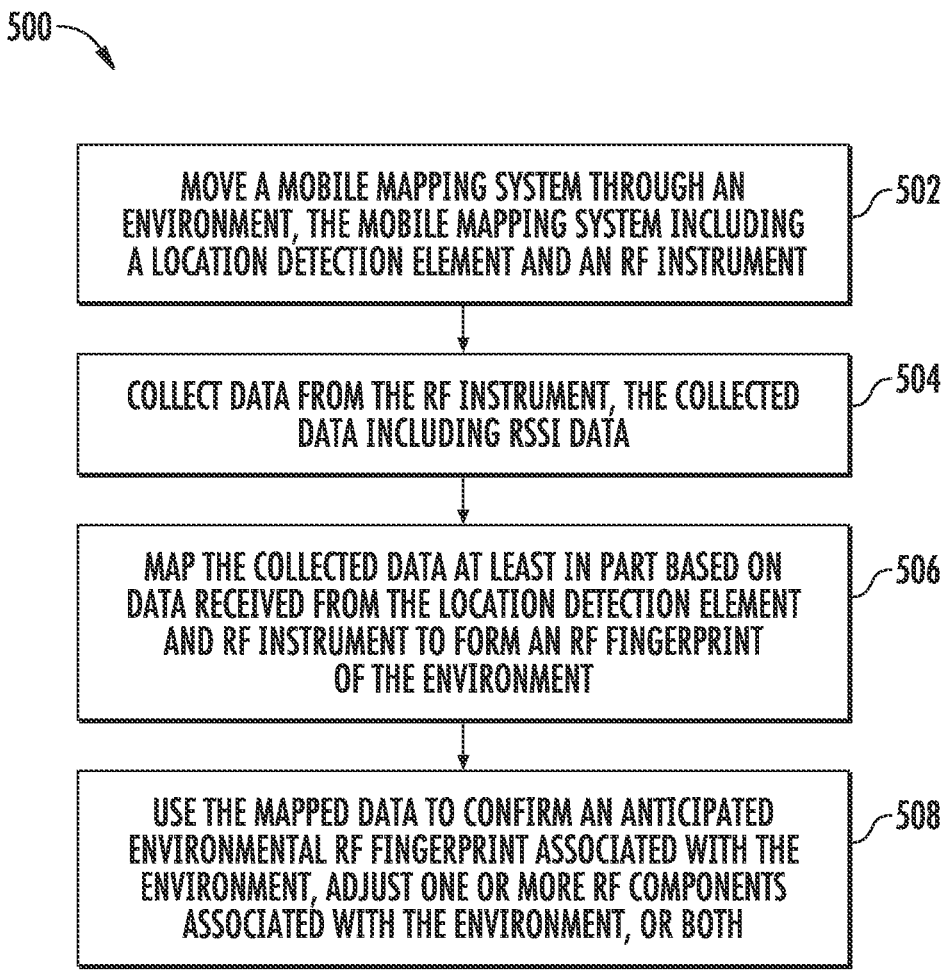
FIG. 5 is a method of mapping an environment in accordance with embodiments of the present disclosure.

FIG. 5 is a flowchart of a method 500 of mapping an environment in accordance with an embodiment. The method 500 includes a step 502 of moving a mobile mapping system (e.g., the aforementioned mobile unit 202) through an environment. The mobile mapping system includes a location detection element and an RF instrument. The method 500 further includes a step 504 of collecting data from the RF instrument. The collected data includes RSSI data. In an embodiment, the step of collecting data is performed while the mobile mapping system is moving. In another embodiment, the step of collecting data is performed while the mobile mapping unit is stopped. The method 500 further includes a step 506 of mapping the collected data at least in part based on data received from the location detection element and the RF instrument to form an RF fingerprint of the environment. The method 500 further includes a step 508 of using the mapped data to confirm an anticipated environmental RF associated with the environment, adjust one or more RF components associated with the environment, or both.

Further aspects of the invention are provided by one or more of the following embodiments:

Embodiment 1. A method of mapping an environment, the method comprising: moving a mobile mapping system through the environment, the mobile mapping system comprising a location detection element and a radio frequency (RF) instrument which receives data from an antenna of the mobile mapping system; collecting data from the RF instrument at one or more collection locations within the environment, the collected data including received signal strength indicator (RSSI) data; mapping the collected data at least in part based on data received from the location detection element and RF instrument to form an RF fingerprint of the environment; and using the mapped data to confirm an anticipated environmental RF fingerprint associated with the environment, adjust one or more RF components associated with the environment, or both.

Embodiment 2. The method of any one or more of the embodiments, wherein the mobile mapping system further comprises one or more optical scanners configured to map physical components of the environment.

Embodiment 3. The method of any one or more of the embodiments, wherein moving the mobile mapping system is performed within the environment, and wherein mapping the collected data is performed at a location external to the environment.

Embodiment 4. The method of any one or more of the embodiments, further comprising removing noise from the collected data before mapping the collected data.

Embodiment 5. The method of any one or more of the embodiments, wherein collecting data from the RF instrument is performed with the mobile mapping system in motion.

Embodiment 6. The method of any one or more of the embodiments, wherein collecting data from the RF instrument is performed while the environment is under construction.

Embodiment 7. The method of any one or more of the embodiments, further comprising interpolating the mapped data to determine RF characteristics at one or more locations between the one or more collection locations at which data was collected.

Embodiment 8. The method of any one or more of the embodiments, further comprising extrapolating the mapped data to determine RF characteristics at one or more extrapolated locations not located between the one or more collection locations.

Embodiment 9. The method of any one or more of the embodiments, further comprising viewing the mapped data through an augmented reality device.

Embodiment 10. A system for mapping an environment, the system comprising: an antenna; a radio frequency (RF) instrument that collects data from one or more locations within the environment using the antenna, the data including received signal strength indicator (RSSI) data; a location detection element; and an optical scanner that maps one or more physical components in the environment, wherein the RF data and data from either one or both of the location detection element or optical scanner are used by a processor to generate mapped data associated with the environment.

Embodiment 11. The system of any one or more of the embodiments, wherein the optical scanner comprises a light detection and ranging (LIDAR) device.

Embodiment 12. The system of any one or more of the embodiments, wherein the system further comprises a backpack or a moveable cart having a plurality of wheels and a handle.

Embodiment 13. The system of any one or more of the embodiments, wherein the system further comprises a processor that maps an RF fingerprint of the environment using the RF data, the RSSI data, and location information obtained from the location detection element.

Embodiment 14. The system of any one or more of the embodiments, wherein the processor further determines the RF fingerprint for locations within the environment where data was not collected by the RF instrument using one or both of interpolation or extrapolation.

Embodiment 15. The system of any one or more of the embodiments, wherein the system further comprises an augmented reality device that displays the RF fingerprint to an operator.

Embodiment 16. The system of any one or more of the embodiments, wherein the RF instrument is configured to collect RF data while moving.

Embodiment 17. A system for mapping an environment, the system comprising: a moveable unit including either a moveable cart having a plurality of wheels and a handle or a backpack; an antenna coupled to the moveable unit; a radio frequency (RF) instrument coupled to the moveable unit, wherein the RF instrument collects data from one or more locations within the environment using the antenna, the data including received signal strength indicator (RSSI) data; a location detection element that determines a three-dimensional spatial position of at least one component of the moveable unit while a mapping operation is in progress and geotags the RF data; a light detection and ranging (LIDAR) device that takes three-dimensional samples of the environment; and a processor that generates an RF fingerprint of the environment using the RF data, the location data, and data from the LIDAR samples.

Embodiment 18. The system of any one or more of the embodiments, wherein the processor extrapolates and interpolates at least the RF data when generating the RF fingerprint.

Embodiment 19. The system of any one or more of the embodiments, wherein system further comprises an augmented reality device that displays the RF fingerprint to an operator.

Embodiment 20. The system of any one or more of the embodiments, wherein the system is configured to be used in an environment under construction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of mapping an environment, the method comprising:
   moving a mobile mapping system through the environment, the mobile mapping system comprising a location detection element and a radio frequency (RF) instrument which receives data from an antenna of the mobile mapping system;
   collecting data from the RF instrument at one or more collection locations within the environment, the collected data including received signal strength indicator (RSSI) data;
   mapping the collected data at least in part based on data received from the location detection element and the RF instrument to form an RF fingerprint of the environment; and
   using the mapped data to confirm an anticipated environmental RF fingerprint associated with the environment, using the mapped data to inform adjustment of one or more RF components associated with the environment, or both.

2. The method of claim 1, wherein the mobile mapping system further comprises one or more optical scanners configured to map physical components of the environment.

3. The method of claim 1, wherein moving the mobile mapping system is performed within the environment, and wherein mapping the collected data is performed at a location external to the environment.

4. The method of claim 1, further comprising removing noise from the collected data before mapping the collected data.

5. The method of claim 1, wherein collecting data from the RF instrument is performed with the mobile mapping system in motion.

6. The method of claim 1, wherein collecting data from the RF instrument is performed while the environment is under construction.

7. The method of claim 1, further comprising interpolating the mapped data to determine RF characteristics at one or more locations between the one or more collection locations at which data was collected.

8. The method of claim 1, further comprising extrapolating the mapped data to determine RF characteristics at one or more extrapolated locations not located between the one or more collection locations.

9. The method of claim 1, further comprising viewing the mapped data through an augmented reality device.

10. A system for mapping an environment, the system comprising:
    an antenna;
    a radio frequency (RF) instrument that collects data from one or more locations within the environment using the antenna, the data including received signal strength indicator (RSSI) data;
    a location detection element; and
    an optical scanner that maps one or more physical components in the environment,
    wherein the RF data and data from either one or both of the location detection element or optical scanner are input to a processor, and wherein the processor uses the input RF data and data from either one or both of the location detection element or optical scanner to generate mapped data associated with the environment.

11. The system of claim 10, wherein the optical scanner comprises a light detection and ranging (LIDAR) device.

12. The system of claim 10, wherein the system further comprises a backpack or a moveable cart having a plurality of wheels and a handle.

13. The system of claim 10, wherein the system further comprises a processor that maps an RF fingerprint of the environment using the RF data, the RSSI data, and location information obtained from the location detection element.

14. The system of claim 13, wherein the processor further determines the RF fingerprint for locations within the environment where data was not collected by the RF instrument using one or both of interpolation or extrapolation.

15. The system of claim 13, wherein the system further comprises an augmented reality device that displays the RF fingerprint to an operator.

16. The system of claim 10, wherein the RF instrument is configured to collect RF data while moving.

17. A system for mapping an environment, the system comprising:
    a moveable unit including either a moveable cart having a plurality of wheels and a handle or a backpack;
    an antenna coupled to the moveable unit;
    a radio frequency (RF) instrument coupled to the moveable unit, wherein the RF instrument collects data from one or more locations within the environment using the antenna, the data including received signal strength indicator (RSSI) data;
    a location detection element that determines a three-dimensional spatial position of at least one component of the moveable unit while a mapping operation is in progress and geotags the RF data;
    a light detection and ranging (LIDAR) device that takes three-dimensional samples of the environment; and
    a processor that generates an RF fingerprint of the environment using a combination of the RF data collected by the RF instrument, the location data determined by the location detection element, and three-dimensional samples taken by the LIDAR device.

18. The system of claim 17, wherein the processor extrapolates and interpolates at least the RF data when generating the RF fingerprint.

19. The system of claim 17, wherein system further comprises an augmented reality device that displays the RF fingerprint to an operator.

20. The system of claim 17, wherein the system is configured to be used in an environment under construction.

* * * * *